United States Patent

[11] 3,547,210

| [72] | Inventors | Herman L. Zimmerman, 257—36 144 Ave., Rosedale, N.Y. 11422 |
|---|---|---|
| [21] | Appl. No. | 695,919 |
| [22] | Filed | Jan. 5, 1968 |
| [45] | Patented | Dec. 15, 1970 |

[54] CALCULATING BALANCE
2 Claims, 2 Drawing Figs.

[52] U.S. Cl. .................................................. 177/1, 177/172, 177/200
[51] Int. Cl. .................................................. G01g 19/00
[50] Field of Search ............................................ 177/25, 34, 35, 36, 43, 44, 171, 172, 200, 199, 1

[56] References Cited
UNITED STATES PATENTS

| 1,229,449 | 6/1917 | Hapgood | 177/25 |
| 1,229,641 | 6/1917 | Munzner | 177/171X |
| 1,379,215 | 5/1921 | Riedel | 177/34 |
| 1,429,907 | 9/1922 | Krick | 177/171X |
| 1,527,788 | 2/1925 | Divine | 177/25 |
| 2,072,436 | 3/1937 | Von Pein | 177/200X |
| 2,165,275 | 7/1939 | Kimball | 177/25 |
| 3,382,941 | 5/1968 | Novak | 177/172X |

*Primary Examiner*—Richard B Wilkinson
*Assistant Examiner*—George H. Miller, Jr.
*Attorney*—March, Gillette & Wyatt ABSTRACT: Measurement of one or more of such properties as length, number of units, area or volume of a material of uniform density is accomplished by balancing a sample of the material, the value of which sample in terms of the property to be measured is known, so that the measuring scale indicates this known value, balancing the material of uniform density whose property is to be measured, and reading the value of the property from the measuring scale.

PATENTED DEC 15 1970
3,547,210
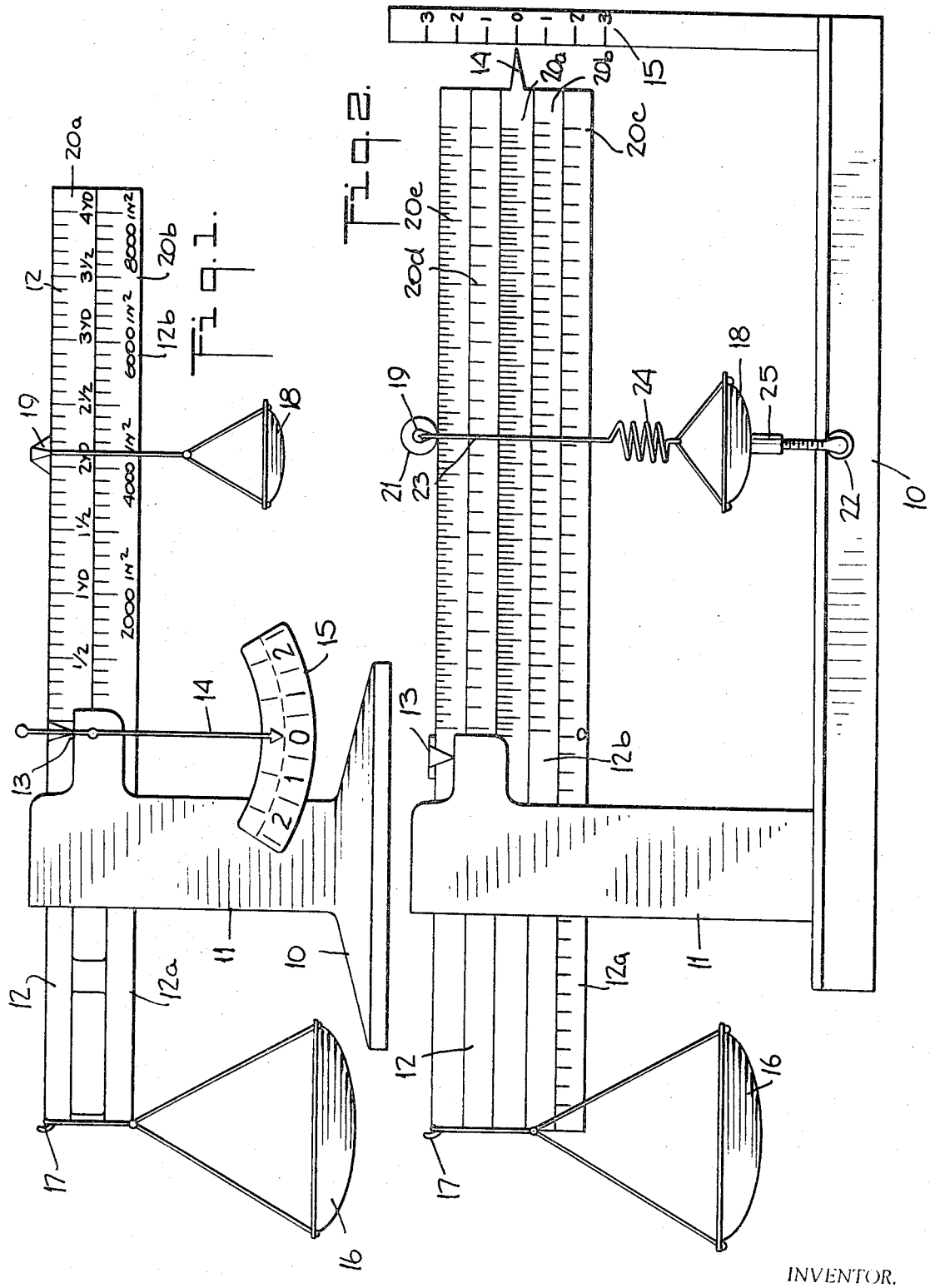
INVENTOR.
HERMAN ZIMMERMAN
BY
March, Gillette Wyatt
ATTORNEY

CALCULATING BALANCE

BACKGROUND OF THE INVENTION

The determination of any of such properties as length, number of units, area or volume of materials of uniform density is a matter of considerable commercial importance. Examples are determinations of the length of wire, length of ribbons, length of sheet metal, etc.; determinations of the number of metal washers, buttons, coins, etc.; determination of the area of fabrics, sheeting material, rugs, carpeting, sheet plastic, paper, etc., the determination of the volume of liquid chemicals, chemical solutions, bulk pure metals, etc.

OBJECTS OF THE INVENTION

It is an object of the present invention to provide a simple and accurate method of directly determining one or more of such properties as length, number of units, area or volume of materials of uniform density.

Another object is to provide a method whereby the length, number of units, area or volume may be directly determined by weighing.

A further object is to provide an apparatus for directly determining any or all of the foregoing properties.

These and other objects of the present invention will be apparent from the following description.

SUMMARY OF THE INVENTION

According to the present invention the length, number of units, area or volume of a material of known density is directly measured in two steps. In one step a sample of the material to be measured, whose value in terms of the property being measured in known, is so balanced that the measuring scale indicates this known value of the sample. In another step the material being measured is balanced. Its value is directly indicated on the measuring scale.

DESCRIPTION OF THE DRAWING

FIG. 1 is a side elevation of one type of balance according to the present invention, and FIG. 2 is a side elevation of a modification of this type of balance.

DETAILED DESCRIPTION

For purposes of illustration the invention will be described with reference to the balance shown in FIG. 1. The balance has a base 10 and supporting post 11 which carries beam 12 mounted upon knife-edge pivot 13. A pointer 14 carried by beam 12 indicates on a suitable scale 15 when the beam is in balance. Beam 12 has an arm 12a which on one side of pivot 13 supports a weighing pan 16 mounted on knife edge 17 at a fixed distance from pivot 13.

Beam 12 on the other side of pivot 13 has an arm 12b, which supports a weighing pan 18 mounted on knife edge 19 and connected thereto by wire 23. Wire 23 supports pan 18 and also serves as measurement indicator for scale 20. Pan 18 may be varied in its weight or mass and in its distance from pivot 13. Arm 12b is graduated, or carries a graduated scale or scales, which give direct readings in one or more of the properties to be measured, i.e., length, number of units, area or volume. In FIG. 1, scale 20a is graduated in units of length, (shown expressed in yards) while scale 20b is graduated in units of area (shown expressed in square inches).

FIG. 2 is a spring tension version of the balance of FIG. 1. Elements 10—20, inclusive, are the same as in FIG. 1. Weighing pan 18 is mounted on arm 13b by knife edge 19 and is connected thereto by wire 23 and spring 24. Knife edge 19 is mounted on ball bearing roller 21 whereby pan 18 may be moved inwardly and outwardly along arm 12b. Pan 18 has at its lower surface adjustable spring tension screw 25 which is connected to ball bearing roller 22 mounted on elongated base 10. Rollers 21 and 22 move in unison with pan 18. Arm 12b contains a plurality of measuring scales 20. Scale 20a is graduated in units of length; scale 20b is graduated in units of area; scale 20c is graduated in units of volume; scale 20d is graduated in units of number and scale 20e is graduated in units weight. Pointer 14 at the outer end of arm 12b indicates on a suitable scale 15 when the beam is in balance.

The foregoing description is intended merely to illustrate suitable balances for carrying out the invention without limiting the invention to any specific balance. Any type of beam balance which has a fixed and a variable weighing pan may be used. Variations and modifications may be included, for example, the balance may contain guide or damping means to prevent the beam from lateral movement and to limit the vertical movement. Various other means may be employed to indicate when the beam is in balance, for example, electrical means adapted to give a signal when the beam is in balance. The beam may contain a single measuring scale graduated to give direct readings of only a single property, in which case by changing the scale the value of another property may be obtained. For greater versatility, the beam may contain a plurality of scales to obtain direct readings in any of several properties without changing scales.

The method of determining the length, number of units, area or volume of a material of uniform density is accomplished in two operations. In one operation a sample of the material of known density whose value in the property to be measured, e.g., length, is known, is placed on weighing pan 16. Pan 18 is positioned on arm 12b so that wire 23 is over the corresponding length on scale 20a. The beam is then balanced by adding weights to pan 18 or adjusting spring tension screw 25, depending on the type of balance used. In the other operation, the material to be measured is placed upon pan 16, after removing the sample therefrom, and pan 18 is moved along arm 12b until the beam is in balance. When the beam is in balance the value of the unknown material is directly indicated by the location of pan 18 and is directly indicated on the measuring scale by wire 23.

The following examples illustrate the present invention without, however, limiting the same thereto.

EXAMPLE 1-DETERMINATION OF LENGTH

Using the type of balance illustrated in FIG. 1, a sample of material of uniformly dense ribbon having specific width W and exactly 1 yard in length is placed on pan 16. Pan 18 is then moved along arm 12b so that wire 23 rests at the 1 yard mark on scale 20a. Weights are added to pan 18 until the beam is in balance and pointer 14 shows a zero reading on scale 15. The mass of pan 18 has now been adjusted for readings for ribbon having the density of the sample and having width W. The sample is removed from pan 16 and replaced with the material whose length is to be determined. Pan 18 is moved along arm 12b until the beam is in balance and pointer 14 shows zero reading. The length of the material is directly indicated on scale 20a by wire 23 and is read directly from the scale.

EXAMPLE 2-DETERMINATION OF AREA

Using the same type of balance as in example 1, a sample of sheeting material of uniform density having an area of 2,000 square inches is obtained by cutting from the sheet of rectangle measuring 40 inches by 50 inches. This sample is placed on pan 16. Pan 18 is then moved along arm 12b so that wire 23 rests at the 2,000 square inch mark on scale 20b. Weights are added to pan 18 until the beam is in balance and pointer 14 shows a zero reading on scale 15. The sample is removed from pan 16 and replaced with sheeting material of the same density and of any shape whose area is to be determined. Pan 18 is moved along arm 12b until the beam is in balance and pointer 14 shows zero reading. The area of the sheeting material is directly indicated on scale 20b by wire 23 and is read directly from the scale.

EXAMPLE 3-DETERMINATION OF NUMBER OF UNITS

Using the type of balance illustrated in FIG. 2, a sample containing 10 identical buttons of uniform density is placed on pan 16 and pan 18 is moved along arm 12b until wire 23 rests over the 10 unit mark on scale 20d. The screw adjustment beneath pan 18 is adjusted until the beam is in balance as indicated by pointer 14. The buttons are then removed from pan 16 and replaced with a mass of buttons of undetermined number. Pan 18 is moved along arm 12b until the beam is in balance as shown by a zero reading on scale 15 by pointer 14. The number of buttons is now directly indicated on scale 20d by wire 23 and is read directly from the scale.

EXAMPLE 4-DETERMINATION OF VOLUME

Using the type of balance illustrated in FIG. 2, a sample of pure metal whose volume has been determined by measurement (in the case of regularly shaped sample, or by displacement in the case of an irregularly shaped sample) is placed on pan 16 and the beam balanced as in the preceding example. A piece of bulk pure metal of any shape is then substituted on pan 16 for the sample. The beam is again balanced by adjusting pan 18 as in the preceding examples and the volume is directly indicated on scale 20c by wire 23 and is read directly from the scale.

The balance of the present invention may also be employed in conventional manner to determine weight and if such use is desired, all that is necessary is to include a weight scale 20e.

In determining the volume of liquids, an empty container is placed on the scale and the scale is adjusted to zero. The container is then filled with the sample of known liquid of uniform density and the determination of the weight is made. Thereafter, the known liquid is removed and the unknown substituted with the volume determined directly from the scale.

In making all the determinations, it is to be understood that the sample and material to be measured must be of uniform density.

It is to be understood that while the invention has been described in detail, variations and modifications may be made without departing from the invention as defined in the appended claims.

I claim:

1. A method for directly determining properties of a material of uniform density which comprises balancing a sample of the material whose value in terms of the property being measured is known in such manner that this known value is indicated on a measuring means, and balancing the material whose property is to be measured in such manner that the value of the property is directly indicated on the measuring means and wherein the balancing steps comprise placing a sample of the material whose value in terms of the property being measured is known in a fixed pan of a beam balance, adjusting a variable pan on the beam balance so that the known value is indicated by the measuring means, balancing the beam, substituting the material whose property is to be determined for the sample, and adjusting the variable pan until the beam is in balance and wherein the beam is balanced by adjusting a tension screw.

2. A calculating balance for determining properties of a material of uniform density which comprises a beam adapted to pivot on a fulcrum, a weighing pan attached to one arm of the beam at a fixed distance from the fulcrum, a second weighing pan attached to the other arm of the beam, the second weighing pan adapted to move inwardly and outwardly along the arm, a measuring scale on the arm bearing the movable weighing pan, the scale containing gradations directly indicating at least one of the properties of length, number of units, area or volume, said second weighing pan being mounted on said other arm of the beam by a knife edge and connected to said knife edge by a wire and a spring, said knife edge being mounted on a roller whereby said second weighing pan may be moved along said other arm, said second weighing pan having at its lower surface an adjustable spring tension screw connected to a second roller mounted on an elongated base so that the rollers move in unison with said second weighing pan.